Sept. 30, 1930. E. S. BRISTOL 1,777,030
METHOD AND APPARATUS FOR COMPENSATING INTEGRATING METERS
Filed Aug. 13, 1925 2 Sheets-Sheet 1
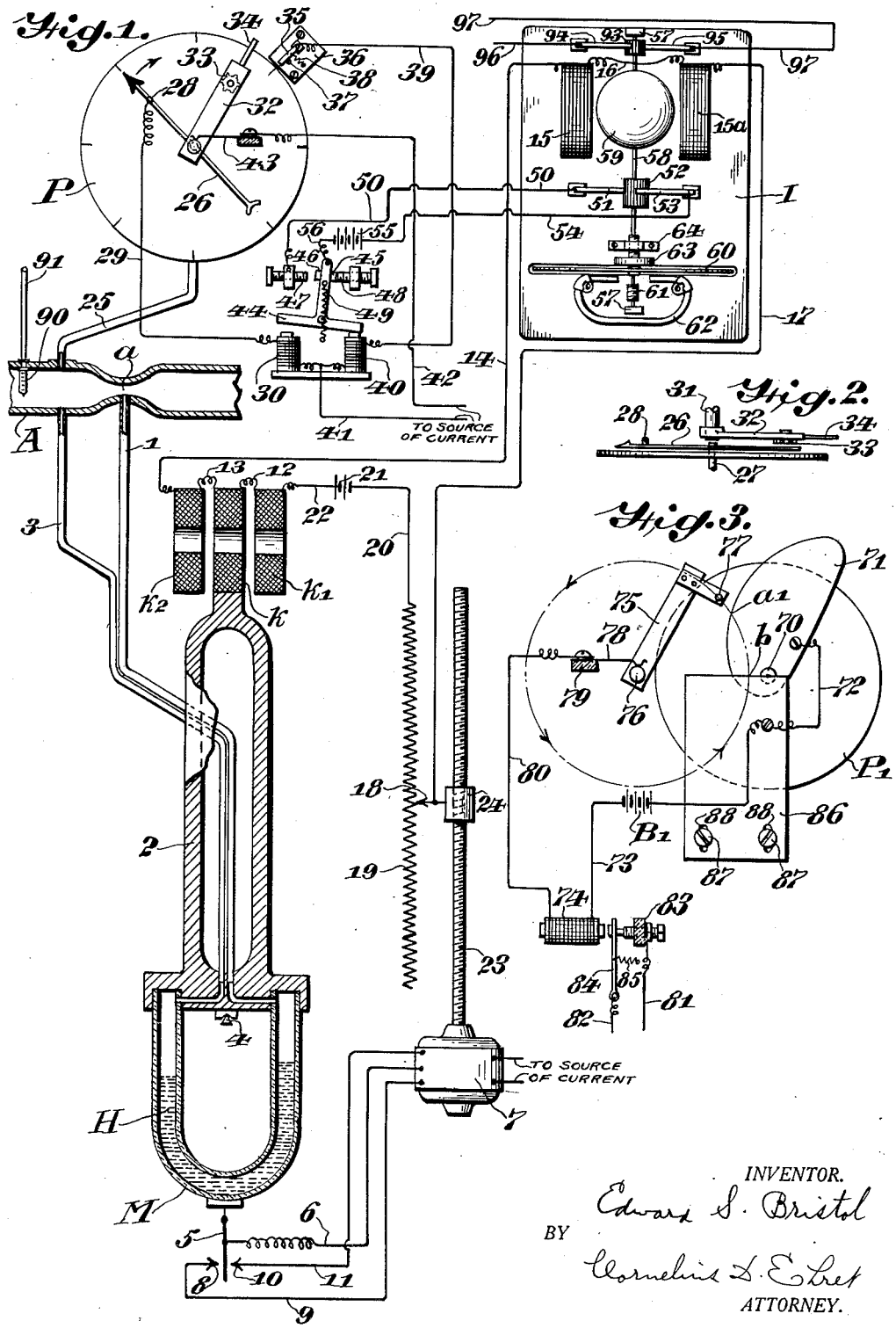
INVENTOR.
Edward S. Bristol
BY
Cornelius L. E. Lret
ATTORNEY.

Sept. 30, 1930.    E. S. BRISTOL    1,777,030
METHOD AND APPARATUS FOR COMPENSATING INTEGRATING METERS
Filed Aug. 13, 1925    2 Sheets-Sheet 2

Inventor
Edward S. Bristol
By Cornelius L. Ebret
his Attorney.

Patented Sept. 30, 1930

1,777,030

UNITED STATES PATENT OFFICE

EDWARD S. BRISTOL, OF PHILADELPHIA, PENNSYLVANIA, ASSIGNOR TO LEEDS & NORTHRUP COMPANY, OF PHILADELPHIA, PENNSYLVANIA, A CORPORATION OF PENNSYLVANIA

METHOD AND APPARATUS FOR COMPENSATING INTEGRATING METERS

Application filed August 13, 1925. Serial No. 50,088.

My invention relates to a method and apparatus utilizable for compensating apparatus of suitable character integrating a quantity, as fluid flow, for change in a condition or conditions, as density, pressure, temperature, heat content, moisture content or other condition, under which the quantity is measured or upon which measurement of the quantity depends.

In accordance with my invention, integrating apparatus, as aforesaid, is compensated for change in a condition or conditions, as aforesaid, by intermittently varying the operation of such apparatus in accordance with change in a condition or conditions.

Further in accordance with my invention, periods of operation of suitable integrating apparatus, as a direct current watthour meter, an alternating current watthour meter, a friction drive integrator, or other integrating mechanism, are controlled in accordance with change in a condition or conditions, as aforesaid.

Further in accordance with my invention, a suitable control medium, as an electric current, maintained at a magnitude dependent in part upon the magnitudes of a quantity, is utilized in operating suitable integrating apparatus, the operation of which is interrupted intermittently and for varying periods in accordance with change in a condition or conditions, as aforesaid and more particularly, a control medium, as aforesaid, maintained at a magnitude dependent in part upon the magnitudes of rate of flow of a fluid is utilized in operating an integrating meter, the operation of which is interrupted intermittently and for varying periods in accordance with change in a condition or conditions, as pressure, or pressure and temperature.

Further in accordance with my invention, a pressure gauge of a type well known in the art is utilized to intermittently interrupt a control circuit for varying periods in accordance with changes in the pressure of the fluid operating the gauge.

My invention resides in the method and apparatus of the character hereinafter described and claimed.

For an illustration of some of the various forms my invention may take, reference is to be had to the accompanying drawings, in which:

Fig. 1 is a diagrammatic view of one form of my invention.

Fig. 2 is a side elevational view showing the pressure gauge pointer and co-operating mechanism.

Fig. 3 is a plan view of another form of my invention.

Figure 4:
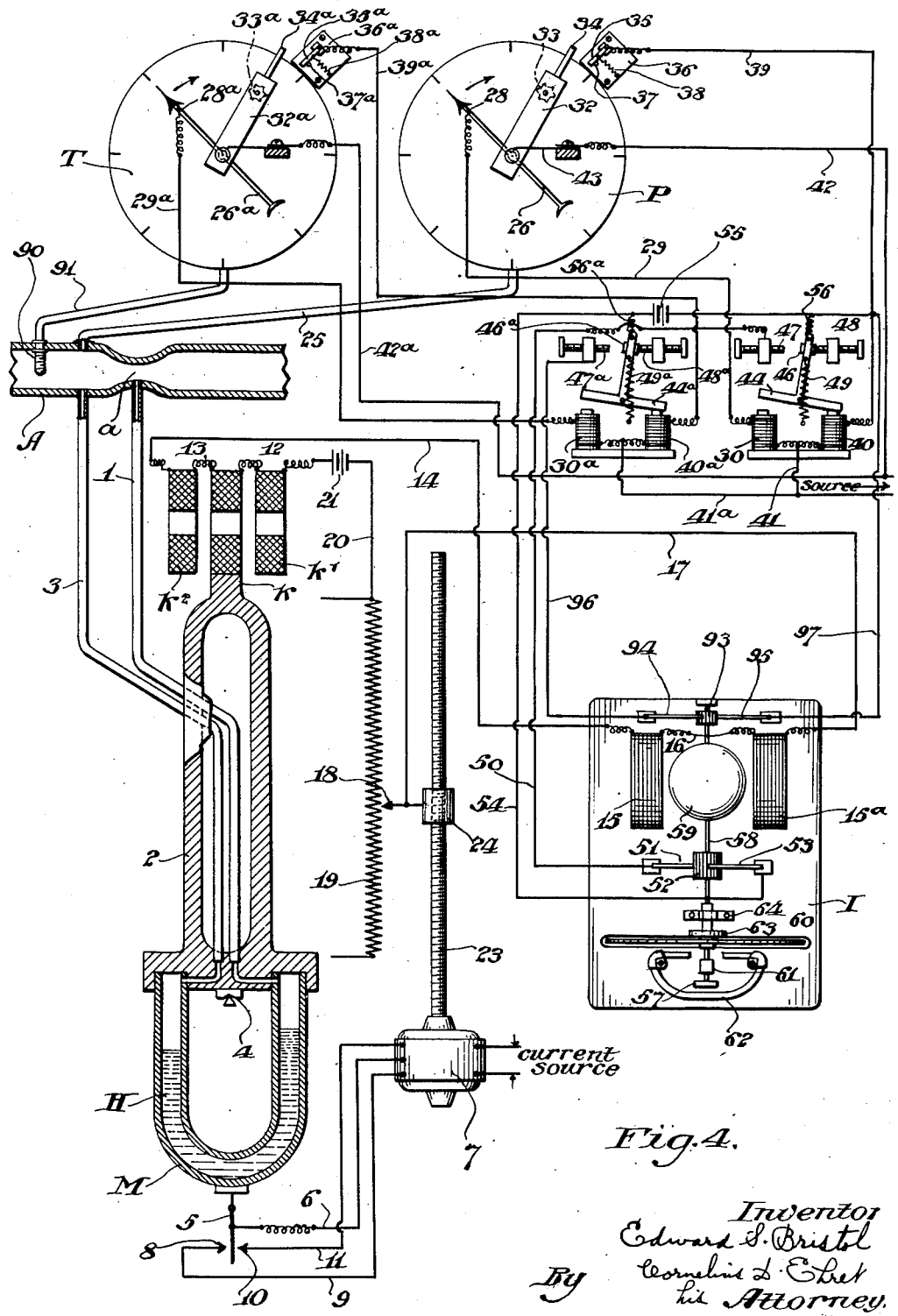
Fig. 4 is a diagrammatic view of another form of my invention.

Referring to Fig. 1, there is illustrated a form of my invention in which an integrating meter is compensated for change in pressure of the metered fluid by intermittently varying the periods of operation of the meter in accordance with changes in the fluid pressure. To this end, a pipe or conduit A, constricted at a desired point to form a throat $a$, conveys an elastic fluid of any desired character, as steam or air. A flexible pressure tube or pipe 1 opening into the throat $a$ passes interiorly into a support 2 and connects with one arm of a U-tube manometer M suitably secured to the support 2; a second flexible pressure tube or pipe 3 opens into the pipe A at a point removed from throat $a$ and likewise passing interiorly into the support 2 connects with the other arm of manometer M. Within the manometer M is a liquid seal H formed of a suitable fluid, as mercury, of greater density than the fluid in tubes 1 and 3.

Support 2 pivotally mounted at 4 carries the movable coil $k$ of a Kelvin balance co-operating with the fixed coils $k^1$ and $k^2$ disposed adjacent to and on either side of the coil $k$. A contact 5 suitably secured to the manometer M is connected by a conductor 6 with one terminal of a reversible electric motor 7. Contact 5 upon movement of the support 2 in one direction engages a contact 8 connected by a conductor 9 with motor 7 and upon reverse movement engages a contact 10 likewise connected with motor 7 by a conductor 11.

Conductors 12 and 13 connect the fixed and movable coils of the Kelvin balance in series and a conductor 14 leading from coil $k^2$ is connected to a field coil 15 of a suitable integrating meter I. A conductor 16 connects coil 15 to a similar coil 15ᵃ, from which the circuit is extended by a conductor 17 to a contact 18 co-acting with, and adjustable with respect to, a resistance 19. A conductor 20 connects resistance 19 to one terminal of a source of current 21, and another conductor 22 connects the other terminal of the source of current to the coil $k^1$. A threaded shaft 23 secured to and rotatable with the armature of motor 7 moves a nut 24 carrying contact 18 in either direction with respect to resistance 19.

A pipe 25, or equivalent, opening into pipe A at a point removed from the throat $a$, leads to a pressure gauge P, of a type well known in the art. In accordance with my invention, pressure gauge P in conjunction with other mechanism is utilized to determine the period of closure of a control circuit, as the armature circuit of the integrating meter I. To this end, the pointer 26 supported on the shaft 27 carries a pin 28 connected by a conductor 29 with a coil 30. A shaft 31 in alignment with shaft 27 supports an arm 32 carrying a toothed wheel 33 and a projecting tip 34, and the latter at definite periods, as hereinafter described, engages a contact lever 35 pivoted to a support 36 and normally held against a stop 37 by a spring 38. Shaft 31 is rotated in a counter-clockwise direction at suitable speed, as one revolution per minute, by any suitable device, as a motor, not shown. Accordingly, the tip 34 periodically engages contact lever 35, and the toothed wheel 33 likewise engages the pin 28 as arm 32 rotates. A conductor 39 connects contact lever 35 with a coil 40, similar to and mounted adjacent coil 30, a conductor 41 connecting coils 30 and 40 to one side of a source of current (not shown), the other side of which is connected by a conductor 42 to a brush 43 bearing upon the shaft 31.

A pivoted armature 44 having contact points 45 and 46 is alternately rocked into engagement with either a contact 47 or a stop 48 by coils 30 and 40, energized singly and intermittently, as hereinafter described. A spring 49 temporarily retains armature 44 in engagement with either contact 47 or stop 48, and when the armature is engaged with the contact, a circuit is closed from contact 47 through conductor 50, brush 51, commutator 52, brush 53, conductor 54, source of current 55 and conductor 56 back to the contact 46.

The integrating meter I comprises bearings 57 supporting a shaft 58 carrying a spherical armature 59, the commutator 52, a disk 60 of suitable material, as aluminum. and a worm 61 driving a counting train (not shown). The flux of a permanent magnet 62 induces eddy currents in disk 60 proportional to its speed of rotation, which react with the permanent magnet flux to produce a braking or retarding action on the disk. If desired, the retarding effect of permanent magnet 62 may be adjusted by a pole piece 63 adjustably mounted on a support 64.

The heights of the mercury columns in the arms of the manometer M are proportional to the pressure differential as determined by the pipes 1 and 3. As the differential varies, mercury is displaced from one of the arms of the U-tube and the support 2 is rocked on its pivot 4. In so doing, contact 5 engages one of the contacts 8 and 10 and closes a circuit through the motor 7 which operates to shift contact 18 and vary the resistance of the circuit including the resistance 19, coils 15 and 15ᵃ, and coils $k$, $k^1$, and $k^2$ of the Kelvin balance. As the resistance changes, the balance tends to and finally does restore the support 2 to normal position, thereby opening the motor circuit at the contact 5, the motor thereupon remaining inactive until the support 2 is again tilted to operate the motor and shift unit 24 to either increase or decrease the resistance of the circuit aforesaid. In the Kelvin balance, the electromagnetic force acting upon the control coil is proportional to the square of the current and in the U-tube manometer M, the force due to the mercury displacement is proportional at a given constant pressure to the square of the rate of flow. Accordingly, the mechanism described above functions at a constant pressure to automatically maintain the electric current flowing through the field coils 15 and 15ᵃ directly proportional to the rate of flow.

For a given pressure, pointer 26 of pressure gauge P assumes a certain position, and as arm 32 rotates, toothed wheel 33 engages pin 28. In so doing, coil 30 is energzied and attracts armature 44 in one direction to cause contact point 46 to engage contact 47 and close the circuit through the commutator 52 of the integrating meter I, thereby causing rotation of shaft 58 and operation of the counting train. As arm 32 continues to rotate, toothed wheel 33 is disengaged from pin 28 and coil 30 deenergized. Contact point 46, however, is maintained in engagement with contact 47 by spring 49.

Continued rotation of arm 32 finally causes engagement of tip 34 with lever 35, whereupon coil 40 is energized and armature 44 attracted in the reverse direction. Thereupon, the circuit of armature 59 is opened at contact point 46, and rotation of shaft 58 and operation of the counting train ceases. As arm 32 continues to rotate, tip 34 is disengaged from lever 35 and coil 40 deenergized. The circuit of armature 59, however, is maintained open by spring 49 until arm 32 again moves toothed wheel 33 into engagement with pin 28.

As the pressure of the fluid increases, pointer 26 moves in the direction of the arrow (Fig. 1), thereby causing the meter I to continue in operation for correspondingly increased periods. As the fluid pressure decreases, pointer 26 moves in the reverse direction, with consequent decreased periods during which meter I is in operation. In this manner, the counting train can be made to indicate the integrated weight of fluid passing a given point in a given period.

As stated above, shaft 31 rotates sweep arm 32 in a counter-clockwise direction. That the sweep arm should rotate in this direction was determined in the following manner:—
As stated, the meter I of Fig. 1 is arranged to register the total weight of fluid passing a given point in a given time, which necessitates a positive correction of the meter for an increase in pressure above a predetermined standard, and vice versa. To secure this relation in the arrangement shown, it is necessary that the armature circuit be closed or energized for progressively increasing periods in accordance with corresponding progressive increases of pressure and likewise closed for progressively decreasing periods in accordance with corresponding progressive decreases of pressure. To attain this end, assuming that pointer 26 moves in a clockwise direction for increase of pressure, arm 32 must revolve in a counter-clockwise direction.

If it is desired that meter I register the total volume of fluid passing a given point in a given time, a negative correction of the meter must be effected for an increase in pressure above a predetermined standard, and vice versa. To secure this relation in the arrangement shown, it is necessary that the armature circuit be energized for progressively decreasing periods in accordance with corresponding progressive increases of pressure, and likewise energized for progressively increasing periods in accordance with corresponding progressive decreases of pressure. Therefore, assuming again that pointer 26 moves in a clockwise direction for increase of pressure, arm 32 must revolve in a clockwise direction.

Summarizing the foregoing, the direction of rotation of the sweep arm is fixed by the relation of the required correction to the change of the condition. Where the required correction increases with increase in the value of the condition, the sweep arm should rotate in the direction opposite the direction of pointer motion for a positive change of the condition. Where the required correction decreases with increase in the value of the condition, the sweep arm should rotate in a direction corresponding to a positive pointer movement.

Obviously, when clockwise rotation of sweep arm 32 is to be effected, the arrangement of parts comprising lever 35, stop 37 and spring 38 should be reversed.

The contact lever 35 must be so located that for a given pressure deviation from normal, the percentage change in the period of integrator motion is substantially equal to the percentage correction required by the pressure deviation. To secure this result, the stationary contact can be located by means of the equation $x = \dfrac{r}{m}$ where $x$ = angle between position of pointer at standard value of the condition and position of contact lever in degrees (counterclockwise rotation assumed positive).

$r$ = ratio of angular pointer movement to change of the condition in degrees per unit change (as degrees per pound per square inch).

$m$ = change of correction factor per unit change of the condition (correction factor at standard value of the condition $= l$).

The above equation holds for rotation of the sweep arm 32 in either direction if proper account is taken of the sign of the quantities involved.

In my invention as shown in Figs. 1 and 2, a correction is applied to the meter I substantially directly proportional to the variation of fluid condition, as the pressure. Where the desired correction is not substantially directly proportional to the variation of fluid condition, such, for example, as might exist when the weight of a fluid is being determined over a wide range of pressure variation, apparatus constructed as indicated in Figs. 1 and 2 does not give an accurate registration of the total weight.

To meet such a condition, I have devised the apparatus illustrated in Fig. 3, in which a shaft 70 is actuated by suitable mechanism $P^1$ responsive to change in a condition of a quantity, as a pressure gauge responsive to change of fluid pressure. A cam 71 carried by shaft 70 is connected by a flexible conductor 72 to a source of current $B^1$, from which the circuit is extended by a conductor 73 to a coil 74. An arm 75 mounted on a shaft 76 rotated by means, not shown, at suitable speed, as one revolution per minute, carries a contact 77. A brush 78 suitably secured to a support 79 bears upon shaft 76, and is connected by a conductor 80 to the coil 74. Conductors 81 and 82 connected in a suitable control circuit, as the circuit of armature 59 of Fig. 1, are connected, respectively, with a relatively fixed contact 83 and an armature 84 biased toward said fixed contact by a spring 85.

A shield 86 of suitable insulating material is adjustably mounted for sliding movement toward and from cam 71 in any desired manner, and one end is preferably held immediately adjacent the center of rotation of the cam by screws 87 extending into binding engagement with slots 88.

In operation, cam 71 will assume positions corresponding to changes in the pressure of the metered fluid. Contact 77 in the course of each cycle of rotation engages a definite portion of the cam, and, as shown in Fig. 3, the portion measured by the arc $a^1$—$b$. During the period of engagement, coil 74 is energized, armature 84 is pulled away from contact 83, and the integrator circuit remains open. However, when contact 77 moves beyond the point $a^1$, coil 74 is deenergized, and operation of the integrator is resumed.

It is to be understood that cam 71 is shaped to give for each value of the condition, as the pressure, the actual arc of contact required to deenergize the control circuit for a period of time which will result in correcting meter I for the deviation of the condition from the chosen standard.

In the foregoing description, I have illustrated and described a method and apparatus for compensating a meter integrating a quantity in accordance with change in a condition under which the quantity is measured or upon which measurement of the quantity depends. It is to be understood, however, that my invention is not to be limited in this manner, for, under some circumstances, it may be desirable to effect compensation of an integrating meter, or equivalent structure, in response to change in a plurality of conditions.

For example, referring to Fig. 4, which shows the subject matter of Fig. 1 associated with additional features about to be described, a bulb 90 or equivalent, extending into the pipe or conduit A, communicates with a pipe 91, both the bulb and pipe containing a suitable gas, as nitrogen, whose pressure changes with change in temperature of the fluid passing through the conduit A. Pipe 91 communicates with a suitable pressure gauge T similar to gauge P, and the gas contained therein as it changes in pressure actuates a member 26ᵃ comprised in said gauge similar to the pointer 26, whose position, then, is a reflection of the temperature of the fluid passing through conduit A just as the position of pointer 26 of gauge P is governed by the pressure of that fluid.

By utilizing apparatus 32ᵃ corresponding, or generally equivalent, to the sweep arm 32 and associated mechanism, and relay structure comprising relays 30ᵃ and 40ᵃ, armature 44ᵃ, etc., similar in structure to the relays associated with pressure gauge P, the position of member 26ᵃ, as aforesaid, responsive to the temperature of the fluid passing through conduit A, is determinative of the period of closure of a circuit, which may be an additional circuit controlling the operation of the meter I. To this end, a commutator 93, corresponding to commutator 52, may be mounted on shaft 58 of said meter. Brushes 94 and 95 bear upon the commutator 93 and are connected, respectively, to conductors 96 and 97. When two commutators are thus utilized, it is to be understood that armature 59 comprises two windings, one connected to commutator 52 and the other to commutator 93.

Conductors 96 and 97 are included in the additional control circuit specified above, being connected respectively to contact 47ᵃ of relay 30ᵃ—40ᵃ and one terminal of battery 55 respectively, and, accordingly, in this phase of my invention, the operation of meter I is controlled in accordance with two changing conditions of the metered quantity, namely, pressure and temperature.

It will be noted that the relay circuits associated with the temperature gauge T are connected across battery 55 in parallel with the relay circuits associated with pressure gauge P, so that either independent or concurrent control of meter I may be effected by the different conditions of the fluid whose quantity is to be integrated.

Although I have illustrated and described the control circuit as including the armature of the integrating meter I, it is to be understood that the field coils of the meter could be included in the control circuit instead of the armature circuit without affecting the character of my invention. Further, it is to be understood that my invention is not limited to the use of an integrating meter of the character described, but that it is applicable to other types, as the type employing a counting mechanism actuated by a frictionally driven wheel movable radially across a revolving disk. Integrators of this character are shown in U. S. Letters Patent No. 920,025 to F. N. Connet and U. S. Letters Patent No. 1,190,701 to E. G. Bailey. In view of such disclosures, it will be readily apparent to those skilled in the art that my invention may be utilized to intermittently lift the driven wheel from contact with the driving disk.

What I claim is:

1. The method of compensating the integration of a quantity for changes in a condition under which said quantity is measured, which comprises maintaining an electric current whose magnitude in part depends upon the magnitude of the quantity, energizing an element of an integrating meter by said current, and periodically controlling the operation of said meter during time intervals varying in accordance with said changes.

2. The method of compensating the integration of a quantity for changes in a condition under which said quantity is measured, which comprises maintaining a continuous electric current whose magnitude in part depends upon the magnitude of the quantity, energizing an element of an integrating meter by said current, and intermittently controlling the speed of said meter during time intervals varying in accordance with said changes.

3. The method of compensating the integration of the rate of flow of a fluid for changes in its pressure, which comprises maintaining an electric current whose magnitude in part depends upon the magnitude of the rate of fluid flow, energizing an element of an integrating meter by said current, and periodically decreasing the speed of said integrating meter during time intervals varying in accordance with changes in the pressure of the fluid.

4. The method of compensating the integration of a quantity for changes in a condition under which said quantity is measured, which comprises maintaining an electric current whose magnitude in part depends upon the magnitude of the quantity, energizing an element of an integrating meter by said current, and intermittently energizing another element of said meter during time intervals varying in accordance with said changes.

5. The method of compensating the integration of a quantity for changes in a condition under which said quantity is measured, which comprises maintaining an electric current whose magnitude in part depends upon the magnitude of the quantity, energizing an element of an integrating meter by said current, and interrupting the energization of another element of said integrating meter during time intervals varying in accordance with said changes.

6. In a system for compensating an integating meter for changes in a condition under which integrated quantity is measured, an integrating meter comprising co-acting driving elements, means for energizing one of said elements by a current varying with the magnitude of said quantity, and means for controlling the operation of said meter during time intervals varying in accordance with the changes in said condition.

7. In a system for compensating an integrating meter for changes in a condition under which integrated quantity is measured, an integrating meter comprising co-acting driving elements, means for energizing one of said elements by a current varying with the magnitude of said quantity, and means for intermittently decreasing the speed of said meter during time intervals varying in accordance with said changes.

8. In a system for compensating an integrating meter for changes in a condition under which integrated quantity is measured, an integrating meter comprising co-acting driving elements, means for energizing one of said elements by a current varying with the magnitude of said quantity, and means for intermittently energizing another of said elements during time intervals varying in accordance with the changes in said condition.

9. The method of compensating the integration of a quantity for changes in a condition under which said quantity is measured, which comprises varying the magnitude of flow of a fluid in accordance with magnitudes of the quantity, operating a meter by said fluid, and intermittently controlling the operation of said meter during a time interval varying in accordance with said changes.

EDWARD S. BRISTOL.